Jan. 8, 1963 P. YAFFEE 3,072,904
CONTROL APPARATUS FOR TRANSMITTING STATION
Original Filed Nov. 4, 1955
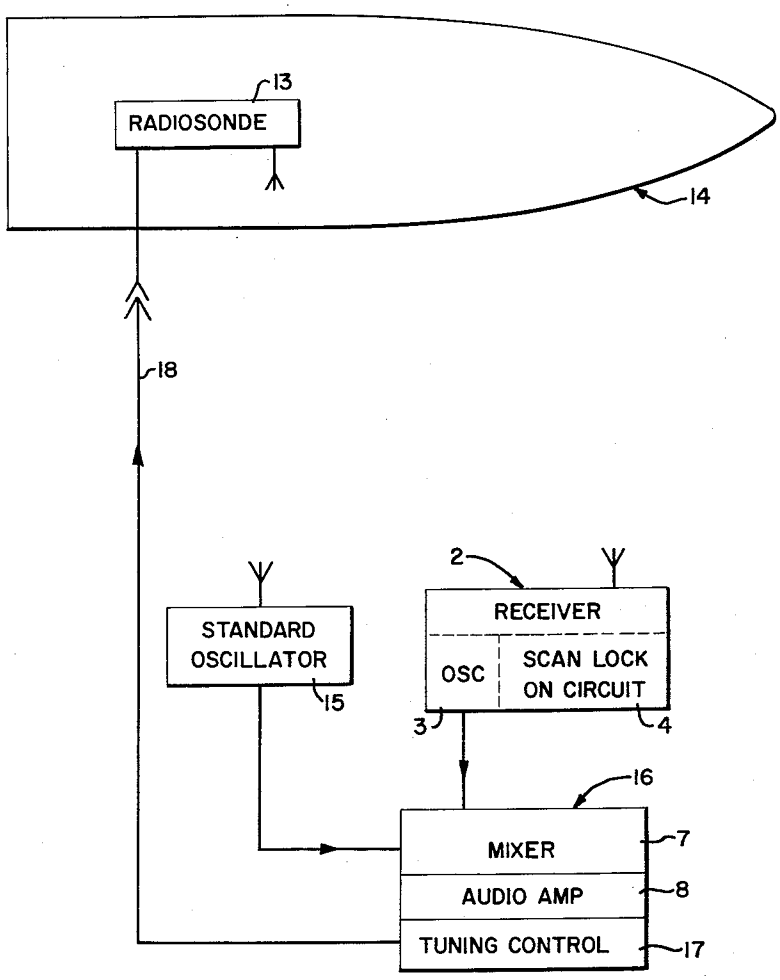
INVENTOR.
P. YAFFEE
BY W. O. Quesenberry
D. C. Hodges
ATTYS.

United States Patent Office 3,072,904

Patented Jan. 8, 1963

3,072,904
CONTROL APPARATUS FOR TRANSMITTING STATION

Philip Yaffee, Kensington, Md., assignor to the United States of America as represented by the Secretary of the Navy Original application Nov. 4, 1955, Ser. No. 545,141, now Patent No. 2,900,635, dated Aug. 18, 1959. Divided and this application June 2, 1959, Ser. No. 825,623
2 Claims. (Cl. 343—227)
(Granted under Title 35, U.S. Code (1952), sec. 266)

The invention described herein may be manufactured and used by or for the Government of the United States of America for governmental purposes without the payment of any royalties thereon or therefor.

This application is a divisional of my copending application, Serial No. 545,141, filed November 4, 1955, now Patent No. 2,900,635.

This invention relates to setting the frequency of transmitting stations and more particularly to setting the frequency of missile guidance radiosondes.

This invention utilizes a standard frequency source that is coupled to a mixing or modulator circuit. The mixer is also supplied by the local oscillator of the receiver which is coupled to the transmitting source. The modulator produces a beat frequency signal that is supplied to an audio amplifier. The output of the audio amplifier is used to control the frequency of the transmitter.

An object of this invention is to provide a new and improved circuit for controlling the frequency of a transmitter.

A further object of the present invention is to provide a frequency setting apparatus for accurately setting the frequencies of missile guidance radiosondes.

Other objects and many of the attendant advantages of this invention will be readily appreciated as the same becomes better understood by reference to the following detailed description when considered in connection with the accompanying drawings wherein:

The single FIGURE is a block diagram of the preferred embodiment of this invention, whereon is shown, in block diagram form, the several units comprising the essential elements of a preferred embodiment of the present invention, which include a scanning, or sweeping, superheterodyne receiver, generally indicated by the numeral 2. The sweeping superheterodyne receiver may be of the conventional type and include a receiving antenna coupled to a band-pass radio frequency amplifier stage, the output of which is coupled to a mixer circuit wherein it is mixed with the output of an oscillator to produce an intermediate frequency output, which in turn is fed into an intermediate frequency stage and thence to an audio output stage.

To accomplish sweeping the oscillator frequency may be varied or tuned, over the range of frequencies to be scanned by means of a sweep device, such as a variable condenser in the local oscillator stage of the receiver. To facilitate the monitoring operation, the receiver may include any conventional type of lock-on circuit for electronically disabling the sweep device thereby to hold the receiver tuned to, or on, the frequency of an intercepted signal and to follow it, if necessary. For purposes of explanation of the present invention, the local oscillator and lock-on circuits are respectively indicated by the numerals 3 and 4.

Operatively connected to sweep receiver 2 is a control unit 16. The output of local oscillator 3 is coupled to mixer 7 as is the signal produced by standard oscillator 15. The signal developed by the mixer is fed to a conventional audio amplifier 8 which will not pass frequencies beyond a certain predetermined upper limit. The signal produced by this amplifier is supplied to tuning control circuit 17 which may be of conventional design. A cable 18 is connected between control 17 and radiosonde 13 which is contained on a suitable vehicle, such as missile 14.

The operation of this invention will now be described in detail. Standard oscillator 15 is tuned to a desired or preselected radiosonde transmitting frequency and the output thereof fed into the mixer 7 of control unit 16 for scan receiver 2. As the radiosonde 13 is being mechanically tuned toward the desired, or preselected, transmitting frequency as set up on standard oscillator 15, receiver 2 is scanning the frequency band in which the radiosonde is transmitting. Upon interception of the radiosonde transmission, receiver 2 looks on to the transmission signal and follows it. The output of the receiver local oscillator 3 is fed into the mixer 7 where it is mixed with the output of oscillator 15. As the radiosonde is tuned toward the desired frequency, the receiver oscillator frequency approaches that of the standard oscillator and a beat signal output is developed on the mixer circuit 7. As the beat signal approaches the passband of audio amplifier 7, a tuning control circuit 17 is actuated whereupon a signal is transmitted through cable 18 for stopping the mechanical tuning operation of the missile radiosonde 13. It is to be understood that although the operation of this control station has been described with reference to a missile radiosonde, other frequency setting applications of the described device will, of course, become evident to those skilled in the art, after understanding the invention.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. Apparatus for remotely tuning a transmitter to a desired frequency comprising tuning means operable for varying the transmitting frequency of a transmitter, signal generating means for developing a signal of a desired frequency, a scanning superheterodyne receiver having a local oscillator responsive to signals from the transmitter, said receiver including a lock-on circuit initially responsive to a signal received from the transmitter for suspending receiver scanning and for effecting receiver following of the varying frequency of the transmitter signal, and circuit means selectively responsive to the difference frequency between the signal developed by said signal generating means and the local oscillator of said receiver for terminating operation of said tuning means.

2. Remote control apparatus for setting up the transmitting frequency of a tunable transmitter comprising tuning means operable for continuously varying the transmitting frequency of the transmitter, a standard oscillator tunable to a predetermined frequency, a sweeping superheterodyne receiver adapted to intercept the transmitted signal thereof, said receiver including a local oscillator and a lock-on circuit for terminating sweeping and for effecting receiver following of the varying transmitter frequency, a mixer circuit connected to said standard oscillator and to the local oscillator of said receiver for developing an output difference frequency signal, and an amplifier circuit coupled to said mixer circuit for terminating operation of said tuning means in response to an output difference signal of a preselected frequency indicative of a transmitter transmitting frequency commensurate with said predetermined frequency and the intermediate frequency of said receiver.

References Cited in the file of this patent

UNITED STATES PATENTS

| | | |
|---|---|---|
| 2,415,874 | Goldstine | Feb. 18, 1947 |
| 2,640,150 | Wu | May 26, 1953 |
| 2,643,329 | Silver | June 23, 1953 |
| 2,648,063 | Schmitt | Aug. 4, 1953 |
| 2,820,889 | Overacker | Jan. 21, 1958 |